(12) United States Patent
Lin et al.

(10) Patent No.: US 10,226,075 B2
(45) Date of Patent: Mar. 12, 2019

(54) ELECTRONIC CIGARETTE WITH LIGHT CAP PERMITTING LIGHT TRANSMISSION

(71) Applicant: Guangrong Lin, Shenzhen, Guangdong (CN)

(72) Inventors: Guangrong Lin, Guangdong (CN); Xianbin Zheng, Guangdong (CN)

(73) Assignee: Guangrong Lin, Shenzhen (CN)

( * ) Notice: Subject to any disclaimer, the term of this patent is extended or adjusted under 35 U.S.C. 154(b) by 45 days.

(21) Appl. No.: 15/515,144

(22) PCT Filed: Aug. 30, 2016

(86) PCT No.: PCT/CN2016/097433
§ 371 (c)(1),
(2) Date: Mar. 28, 2017

(87) PCT Pub. No.: WO2017/041647
PCT Pub. Date: Mar. 16, 2017

(65) Prior Publication Data
US 2017/0224023 A1   Aug. 10, 2017

(30) Foreign Application Priority Data

Sep. 10, 2015   (CN) .................... 2015 2 0700936 U

(51) Int. Cl.
*A24F 47/00* (2006.01)
*G08B 5/36* (2006.01)
*H02J 7/00* (2006.01)

(52) U.S. Cl.
CPC ............ *A24F 47/008* (2013.01); *A24F 47/00* (2013.01); *A24F 47/002* (2013.01); *G08B 5/36* (2013.01); *H02J 7/0068* (2013.01)

(58) Field of Classification Search
None
See application file for complete search history.

(56) References Cited

U.S. PATENT DOCUMENTS

2015/0208724 A1*  7/2015  Wu .................... A24F 47/008
                                                131/329

FOREIGN PATENT DOCUMENTS

| CN | 103720055 A | 4/2014 |
|---|---|---|
| CN | 203659946 U | 6/2014 |
| CN | 203913377 U | 11/2014 |

OTHER PUBLICATIONS

International Search Report of PCT Patent Application No. PCT/CN2016/097433 dated Nov. 28, 2016.

* cited by examiner

*Primary Examiner* — Michael J Felton
*Assistant Examiner* — Katherine A Will

(57) ABSTRACT

The present invention discloses an electronic cigarette having a light cap (2) permitting light transmission, the light cap (2) has a circular lid (22) having a top exterior surface (223) coated with an opaque layer (226). Narrow annular light is allowed to transmit through a peripheral annular region (222) of the circular lid (22) and emit out of the electronic cigarette when users are smoking.

9 Claims, 4 Drawing Sheets

ELECTRONIC CIGARETTE WITH LIGHT CAP PERMITTING LIGHT TRANSMISSION

FIELD OF THE INVENTION

The present invention relates to the field of electronic cigarette. More specifically, it relates to an electronic cigarette having a light cap permitting light transmission.

BACKGROUND OF THE INVENTION

Electronic cigarettes use a vaporizer to heat and vaporize the cigarette liquid solution (e-liquid) to create an aerosolized vapor for users to inhale. Electronic cigarettes have gradually replaced tobacco cigarettes and been widely used because they barely cause health issues due to their lack of tobacco tars.

Normally, electronic cigarettes comprise a cigarette pipe, a light cap at one end of the cigarette pipe and a mouthpiece at the other end of the cigarette pipe. The cigarette pipe is provided with a circuit board, a battery, a vaporizer assembly and other components therein. The vaporizer assembly comprises a liquid-storage device and a vaporizing device, wherein the vaporizing device comprises a liquid-guiding wick and a heating coil. The battery provides the heating coil with power. After being powered, the heating coil may heat up the e-liquid drawn up by the liquid-guiding wick. The e-liquid is therefore vaporized and turns into vapor coming out of the electronic cigarette. Existing electronic cigarettes, whose light cap normally simulates the glow of burning tobacco in a manner of giving red light at the tip of the light cap, is somehow of bad repercussion in public. Nowadays, more and more people argue against smoking in public, such vivid glow at the tip of the electronic cigarette light cap consequentially irritates people. On the other hand, the harsh light also brings users an unpleasant experience.

SUMMARY OF THE INVENTION

The present invention aims at providing an electronic cigarette with a light cap permitting light transmission to overcome the above-mentioned drawbacks of the current electronic cigarettes. The electronic cigarette of the present invention sends narrow annular glow from its light cap.

The technical solution of the present invention is carried out where an electronic cigarette having a light cap permitting light transmission comprises a cigarette pipe, a light cap arranged at one end of the cigarette pipe, a mouthpiece arranged at the other end of the cigarette pipe, a battery arranged in the cigarette pipe and a vaporizer assembly arranged in the cigarette pipe. The light cap consists of a cap tube and a circular lid located at one end of the cap tube. The circular lid has a brim portion starting from a junction portion of the circular lid and the cap tube and terminating at a circular edge of the circular lid. The cigarette pipe sheathes the cap tube with an end surface of the cigarette pipe abutted against the brim portion of the circular lid. The cigarette pipe stands on the brim portion and covers a non-peripheral annular region of the brim portion, which renders the rest of the brim portion a peripheral annular region protruding over an exterior wall of the cigarette pip. The circular lid is made of a transparent plastic material. A top exterior surface of the circular lid is coated with an opaque layer. Light is allowed to transmit through the peripheral annular region and emit out of the electronic cigarette when users are vaping.

Preferably, an indicating light that indicates smoking status is arranged in the light cap.

Preferably, an annular ring width of the peripheral annular region ranges from 0.05 mm to 1 mm.

Preferably, a lateral circumferential surface of the peripheral annular region of the circular lid is coated with the opaque layer. Light is allowed to emit out of the electronic cigarette from an inner surface of the peripheral annular region of the circular lid.

Preferably, the cap tube and the circular lid are formed as a one-piece structure using a transparent plastic material.

Preferably, the opaque layer coated on the top exterior surface of the circular lid is a layer of plated metal.

Preferably, the light cap is provided with an air sensor, an air sensor holder and a circuit board.

Preferably, at a center of one end of the air sensor holder there is a chamber configured to hold the air sensor while a through hole is arranged at a bottom of the chamber; on the other end of the air sensor holder there is provided with at least two protruding stages; a wireway, arranged between two protruding stages, is provided with a wire passage hole perforating the air sensor holder.

Preferably, an inner surface of the brim portion of the circular lid has a radially-arranged groove configured for communicating with an air inlet located at the junction portion of the circular lid and the cap tube.

Preferably, inside the light cap, at least two bumps are arranged at the joint of the junction portion of the circular lid and the cap tube for holding components positioned in the light cap.

In the present invention, a glow of light may indicate the smoking status when users are vaping the electronic cigarettes of the present invention. Users are able to check whether the electronic cigarette is functioning well by checking whether there is light being sent through the transparent material of the light cap. Since the indicating light coming through is narrow annular glow, it therefore brings users visual aesthetic and a pleasant experience.

Figure 1:
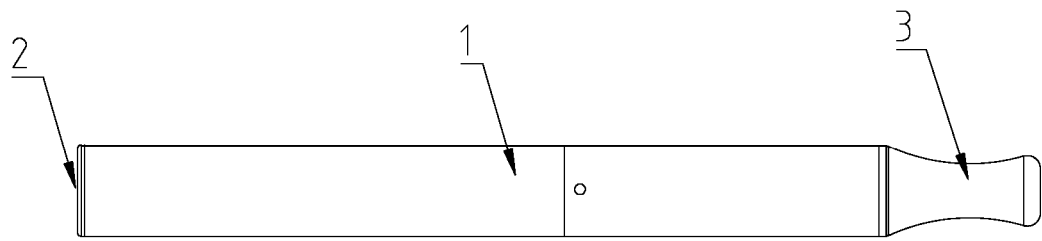
FIG. 1 is a schematic view of an electronic cigarette according to one embodiment of the present invention.

LIST OF REFERENCE NUMERALS 1. cigarette pipe
2. light cap 21. cap tube
22. circular lid
221. brim portion
222. peripheral annular region
223. top exterior surface of circular lid
224. inner surface of peripheral annular region
225. lateral circumferential surface of peripheral annular region
226. opaque layer
23. groove
24. air inlet
25. bump
3. mouthpiece
4. air sensor
5. air sensor holder
51. chamber
52. through hole
53. protruding stage
54. wireway
55. wire passage hole
6. circuit board
7. battery

DETAILED DESCRIPTION OF ILLUSTRATED EMBODIMENTS

Embodiments of the present invention are further explained clearly as follows in conjunction with figures.

Figure 2:
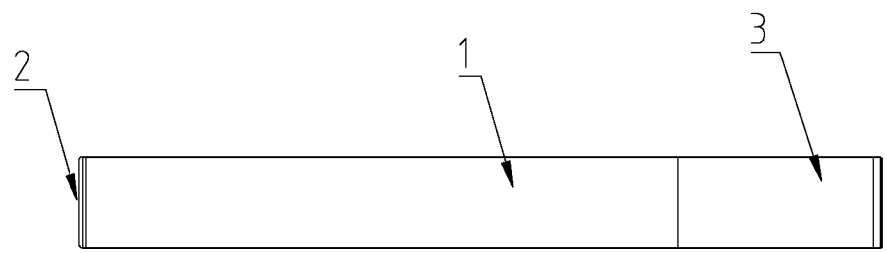
FIG. 2 is a schematic view of an electronic cigarette according to another embodiment of the present invention.

As shown in FIGS. 1 and 2, an electronic cigarette of the present invention comprises a cigarette pipe 1, a light cap 2 and a mouthpiece 3.

Figure 3:
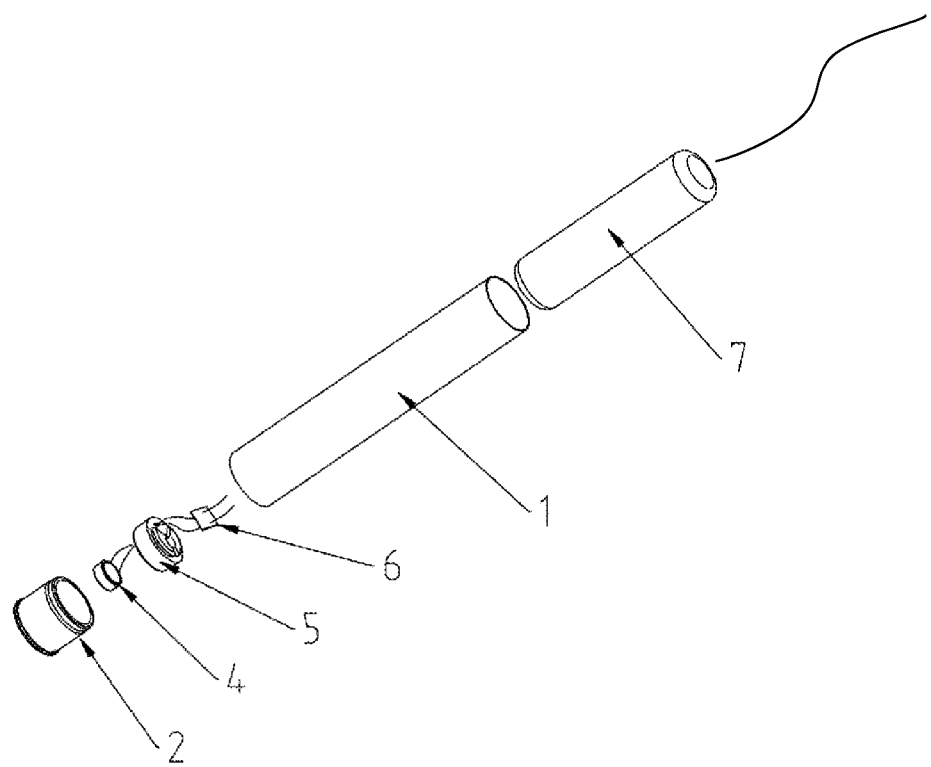
FIG. 3 is an exploded view of a part of an electronic cigarette according to an embodiment of the present invention.

As shown in FIG. 3, the light cap 2 is sheathed in one end of the cigarette pipe 1. An air sensor 4, an air sensor holder 5 and a circuit board 6 are positioned in the light cap 2. The cigarette pipe is also provided with a battery 7 and a vaporizer assembly (not shown) therein.

As shown in FIG. 3, the light cap 2 in the current embodiment has the air sensor 4 arranged in, which is followed by the air sensor holder 5 and the circuit board 6 in order. The air sensor 4 is used for detecting airflow while users are using the electronic cigarette. When users inhale by sucking the mouthpiece 3, air comes in running through the air sensor 4 which in turn sends a signal to the circuit board 6 so as to power a heating coil (not shown in figure) so as to vaporize the e-liquid and thus create vapor. The air sensor holder 5 is configured to hold the air sensor 4 in a fixed position so as to ensure its proper function. Locating the air sensor 4, the air sensor holder 5 and the circuit board 6 in the light cap 2, on one hand, puts them in the vicinity of external environment and permits their access to airflow therefore makes the airflow be readily detected by them; and on the other hand, allows an easier assembly.

As shown in FIGS. 4, 5, 6 and 7, the light cap 2 consists of a cap tube 21 and a circular lid 22 located at one end of the cap tube 21. The circular lid 22 and the cap tube 21 are concentrically arranged where a diameter of the circular lid 22 is larger than an external diameter of the cap tube 21. The circular lid 22 has a brim portion 221 starting from a junction portion of the circular lid 22 and the cap tube 21 and terminating at a circular edge of the circular lid 22. The cigarette pipe 1 sheathes the cap tube 21 with an end surface of the cigarette pipe 1 abutted against the brim portion 221 of the circular lid 22. The cigarette pipe 1 stands on the brim portion 221 and covers a non-peripheral annular region of the brim portion 221, which renders the rest of the brim portion 221 a peripheral annular region 222 protruding over an exterior wall of the cigarette pipe 1. According to the current embodiment, the cap tube 21 and the circular lid 22 are formed as a one-piece structure using a transparent plastic material. Whereas a top exterior surface 223 of the circular lid 22 and a lateral circumferential surface 225 of the peripheral annular region 222 of the circular lid 22 are coated with an opaque layer 226. In this embodiment, the opaque layer 226 is a layer of plated metal. An indicating light (not shown in the figures), electronically connected to or attached on the circuit board 4, is positioned in the light cap 2 for indicating smoking status.

Figure 7:
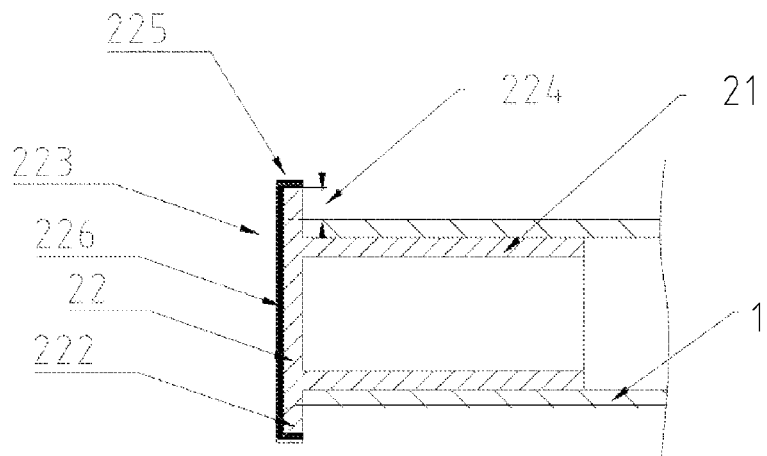
FIG. 7 is a cross-sectional view of a light cap of an electronic cigarette of the present invention, the light cap being sheathed in a cigarette pipe of the present invention.
Figure 8:
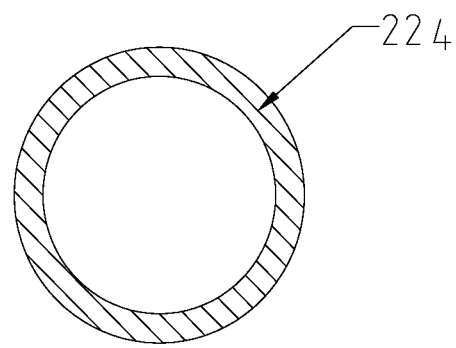
FIG. 8 shows glow emitting from a light cap of an electronic cigarette of the present invention.

As shown in FIGS. 7 and 8, according to the current embodiment, when smoking, the electronic cigarette is triggered to be in working condition and the indicating light thus glows when it is turned on. The glowing light shines through the cap tube 21 and the circular lid 22 that are made of transparent material, reflects off the opaque layer 226 coated with plated metal, and emits out of the electronic cigarette from an inner surface 224 of the peripheral annular region 222 of the circular lid 22. The area where the light coming out is located right in front of users as they vape and gives out a pleasant narrow annular glow. This not only makes it easy for users to check whether the electronic cigarette is functioning well but also brings users visual aesthetic and a pleasant experience.

As shown in FIG. 7, in the current embodiment, an annular ring width of the peripheral annular region 222 ranges from 0.05 mm to 1 mm, that is to say, the peripheral annular region 222 exceeds the exterior wall of the cigarette pipe 0.05-1 mm. Such design is intended to allow the light to shine through without prejudicing the beautiful appearance of the electronic cigarette or causing it easy to get damaged.

Figure 9:
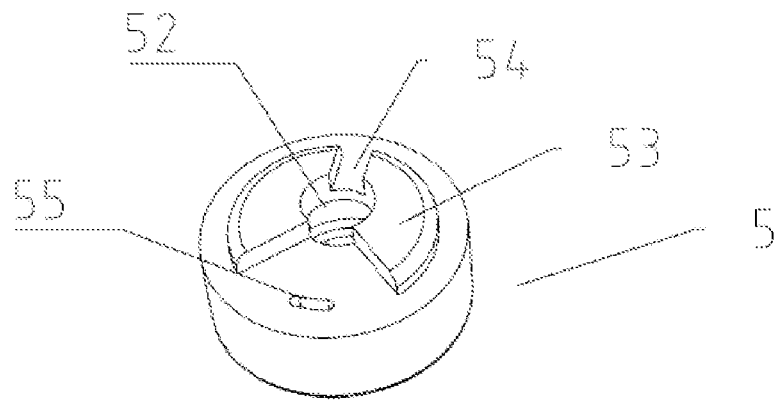
FIG. 9 is a perspective view of air sensor holder of an electronic cigarette of the present invention.
Figure 10:
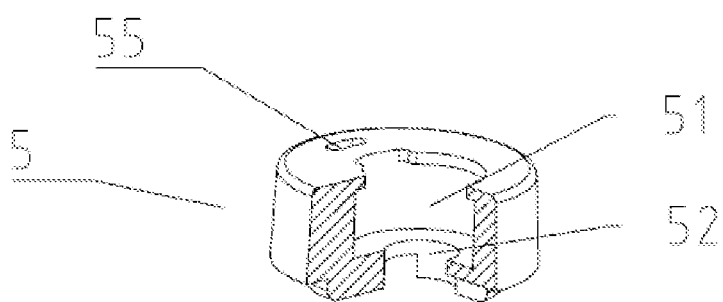
FIG. 10 is a schematic view of an air sensor holder of an electronic cigarette of the present invention, the air sensor holder being partially sectioned.

As shown in FIGS. 9 and 10, at a center of one end of the air sensor holder 5 there is a chamber 51 configured to hold the air sensor 4 while a through hole 52 is arranged at a bottom of the chamber 51. On the other end of the air sensor holder 5 there is provided with at least two protruding stages 53 that abutted against the circuit board 6. A wireway 54 is arranged between two protruding stages 53 for positioning wires as well as allowing airflow. The wireway 54 is provided with a wire passage hole 55 perforating the air sensor holder 5. The present embodiment adopts silicone rubber as a material of forming the air sensor holder 5. The advantage of using silicone rubber is that, to some extends, it has resilience, which gives rise to the air sensor 4 easily fitting in and gaps between the air sensor 4 and an inner wall of the light cap 2 being filled up, thus makes sure that the air coming in is all directed to run through the air sensor 4 for being detected.

Figure 4:
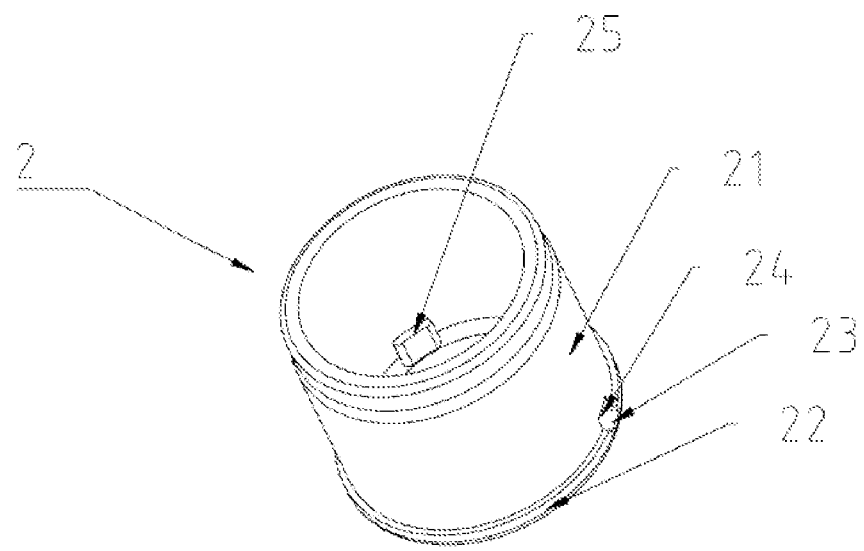
FIG. 4 is a perspective view of a light cap of an electronic cigarette of the present invention.
Figure 5:
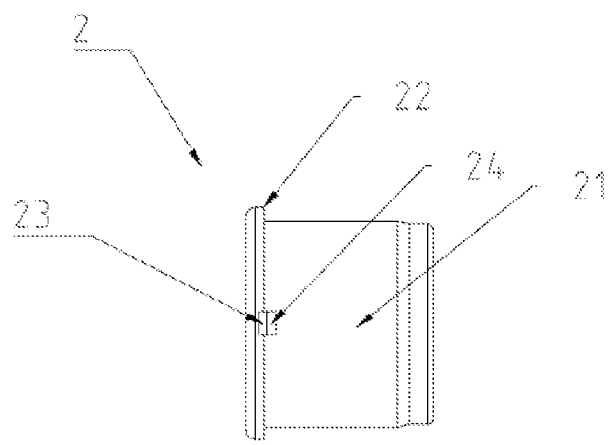
FIG. 5 is a side view of a light cap of an electronic cigarette of the present invention.
Figure 6:
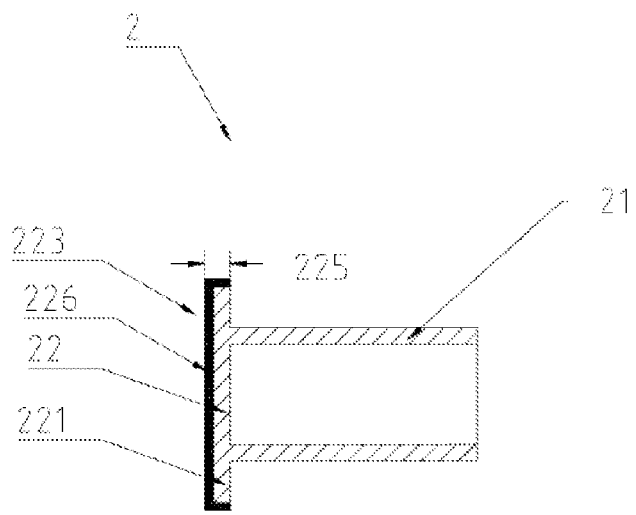
FIG. 6 is a cross-sectional view of a light cap of an electronic cigarette of the present invention.

As shown in FIGS. 4 and 5, an inner surface of the brim portion 221 (i.e., a bottom surface of the brim portion 221) of the circular lid 22 has a radially-arranged groove 23 configured for communicating with an air inlet 24 located at the junction portion of the circular lid 22 and the cap tube 21. The groove 23 exists because it leaves a hole for air to come in through the air inlet 24 as the cigarette pipe 1 will block the air inlet 24 when it sleeves on the cap tube 21. The design of the groove 23 and the air inlet 24 is intended to satisfy the need for letting air come in to the air sensor 4 as well as add to the beauty of the electronic cigarette since such design is arranged covertly.

As shown in FIGS. 3 and 4, inside the light cap 2, four bumps 25 are arranged at the junction portion of the circular lid 22 and the cap tube 21. The bumps 25 are capable of holding the components positioned in the light cap 2, for example the air sensor 4, the air sensor holder 5 and the circuit board 6, so as to avoid these components in the light cap 2 plugging the air inlet 24.

The above-mentioned embodiments are the preferred embodiments of the present invention and are considered in all respects as illustrative and not restrictive. Variations and modifications are allowed within the scope of the invention. Those skilled in the art will appreciate that the features described above can be combined in various ways to form multiple variations of the invention. As a result, such variations fall within the scope of the protection to the present invention.

What is claimed is:

1. An electronic cigarette having a light cap permitting light transmission, comprising a cigarette pipe, a light cap arranged at one end of the cigarette pipe, a mouthpiece arranged at the other end of the cigarette pipe, a battery arranged in the cigarette pipe and a vaporizer assembly arranged in the cigarette pipe, characterized in that:
    the light cap consists of a cap tube and a circular lid located at one end of the cap tube;
    the circular lid has a brim portion starting from a junction portion of the circular lid and the cap tube and terminating at a circular edge of the circular lid;
    the cigarette pipe sheathes the cap tube with an end surface of the cigarette pipe abutted against the brim portion of the circular lid;
    the cigarette pipe stands on the brim portion and covers a non-peripheral annular region of the brim portion, which renders the rest of the brim portion a peripheral annular region protruding over an exterior wall of the cigarette pipe;
    the circular lid is made of transparent plastic material, a top exterior surface of the circular lid is coated with an opaque layer;
    a lateral circumferential surface of the peripheral annular region of the circular lid is coated with the opaque layer, light is allowed to emit out of the electronic cigarette from an inner surface of the peripheral annular region of the circular lid.

2. The electronic cigarette having a light cap permitting light transmission according to claim 1, characterized in that an indicating light that indicates smoking status is arranged in the light cap.

3. The electronic cigarette having a light cap permitting light transmission according to claim 1, characterized in that an annular ring width of the peripheral annular region ranges from 0.05 mm to 1 mm.

4. The electronic cigarette having a light cap permitting light transmission according to claim 1, characterized in that the cap tube and the circular lid are formed as a one-piece structure using a transparent plastic material.

5. The electronic cigarette having a light cap permitting light transmission according to claim 1, characterized in that the opaque layer coated on the top exterior surface of the circular lid is a layer of plated metal.

6. The electronic cigarette having a light cap permitting light transmission according to claim 1, characterized in that the light cap is provided with an air sensor, an air sensor holder and a circuit board.

7. The electronic cigarette having a light cap permitting light transmission according to claim 6, characterized in that:
    at a center of one end of the air sensor holder there is a chamber configured to hold the air sensor while a through hole is arranged at a bottom of the chamber;
    on the other end of the air sensor holder there is provided with at least two protruding stages;
    a wireway is arranged between two protruding stages, the wireway is provided with a wire passage hole perforating the air sensor holder.

8. The electronic cigarette having a light cap permitting light transmission according to claim 1, characterized in that an inner surface of the brim portion of the circular lid has a radially-arranged groove configured for communicating with an air inlet located at the junction portion of the circular lid and the cap tube.

9. The electronic cigarette having a light cap permitting light transmission according to claim 7, characterized in that inside the light cap, at least two bumps are arranged at the joint of the junction portion of the circular lid and the cap tube for holding components positioned in the light cap.

* * * * *